US011258274B2

(12) United States Patent
Sung

(10) Patent No.: US 11,258,274 B2
(45) Date of Patent: Feb. 22, 2022

(54) APPARATUS AND METHOD FOR BATTERY MODULE BALANCING

(71) Applicant: LG ENERGY SOLUTION, LTD., Seoul (KR)

(72) Inventor: Chang-Hyun Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/042,449

(22) PCT Filed: Oct. 15, 2019

(86) PCT No.: PCT/KR2019/013525
§ 371 (c)(1),
(2) Date: Sep. 28, 2020

(87) PCT Pub. No.: WO2020/080802
PCT Pub. Date: Apr. 23, 2020

(65) Prior Publication Data
US 2021/0083485 A1    Mar. 18, 2021

(30) Foreign Application Priority Data

Oct. 16, 2018    (KR) .......................... 10-2018-0123412

(51) Int. Cl.
*H01M 10/44* (2006.01)
*H01M 10/46* (2006.01)
*H02J 7/00* (2006.01)

(52) U.S. Cl.
CPC .......... *H02J 7/0016* (2013.01); *H02J 7/0047* (2013.01)

(58) Field of Classification Search
CPC ...... H02J 7/0016; H02J 7/0019; H02J 7/0047; H02J 7/0018; H01M 2010/4271; H01M 2010/4278
USPC ......... 320/107, 116, 118, 119, 122, 132, 148
See application file for complete search history.

(56) References Cited

U.S. PATENT DOCUMENTS

| 6,750,631 B2 | 6/2004 | Perelle |
| 8,692,516 B2 | 4/2014 | Nork et al. |
| 9,923,247 B2 | 3/2018 | Beaston et al. |
| (Continued) | | |

FOREIGN PATENT DOCUMENTS

| JP | 2013-116008 A | 6/2013 |
| JP | 2014-147149 A | 8/2014 |
| (Continued) | | |

OTHER PUBLICATIONS

International Search Report (PCT/ISA/210) issued in PCT/KR2019/013525 dated Jan. 22, 2020.

(Continued)

*Primary Examiner* — Edward Tso
(74) *Attorney, Agent, or Firm* — Birch, Stewart, Kolasch & Birch, LLP

(57) ABSTRACT

The present disclosure relates to an apparatus and method for equalizing the charge of a plurality of battery modules while balancing the plurality of battery modules included in a battery pack. The present disclosure has an advantage of allowing easy manufacture of the battery pack with a reduced size since of the battery pack connectors may be simplified and the volume of wire harness may be reduced.

10 Claims, 6 Drawing Sheets

(56) References Cited

U.S. PATENT DOCUMENTS

| | | | |
|---|---|---|---|
| 2010/0231166 A1* | 9/2010 | Lee | H02J 7/0018 |
| | | | 320/118 |
| 2012/0074895 A1* | 3/2012 | Roeper | H02J 7/0019 |
| | | | 320/103 |
| 2012/0286733 A1 | 11/2012 | Chang et al. | |
| 2013/0264875 A1 | 10/2013 | Kaminsky et al. | |
| 2014/0354236 A1* | 12/2014 | Kim | H02J 7/04 |
| | | | 320/134 |
| 2015/0326041 A1 | 11/2015 | Hamada et al. | |
| 2016/0311328 A1 | 10/2016 | Kim et al. | |

FOREIGN PATENT DOCUMENTS

| | | |
|---|---|---|
| JP | 5569418 B2 | 8/2014 |
| JP | 2016-208832 A | 12/2016 |
| KR | 10-2010-0093464 A | 8/2010 |
| KR | 10-2014-0140355 A | 12/2014 |
| KR | 10-1780396 B1 | 9/2017 |
| WO | WO 98/11620 A1 | 3/1998 |
| WO | WO 2010/051439 A2 | 5/2010 |

OTHER PUBLICATIONS

Plett, "Extended Kalman filtering for battery management systems of LiPB-based HEV battery packs", Part 1 Background, Journal of Power Sources 2014, vol. 134, pp. 252-261.

Plett, "Extended Kalman filtering for battery management systems of LiPB-based HEV battery packs", Part 2. Modeling and identification, Journal of Power Sources 2004, vol. 134, pp. 262-276.

Plett, "Extended Kalman fiftering for battery management systems of LiPB-based HEV battery packs", Part 3. State and parameter estimation, Journal of Power Sources 2004, vol. 134, pp. 277-292.

Extended European Search Report ("EESR") dated Jul. 9, 2021 for European Application No. 19873876.7.

* cited by examiner

APPARATUS AND METHOD FOR BATTERY MODULE BALANCING

TECHNICAL FIELD

The present application claims priority to Korean Patent Application No. 10-2018-0123412 filed on Oct. 16, 2018 in the Republic of Korea, the disclosures of which are incorporated herein by reference.

The present disclosure relates to an apparatus and method for battery module balancing, and more particularly, to an apparatus and method for battery module balancing capable of effectively equalizing charges of battery modules while balancing a plurality of battery modules included in a battery pack.

BACKGROUND ART

In recent years, the demand for portable electronic products such as notebook computers, video cameras and portable phones has increased sharply, and the energy storage batteries, robots and satellites has been active developed. Accordingly, high-performance secondary batteries allowing repeated charging and discharging are being actively studied.

Secondary batteries commercially available at present include nickel-cadmium batteries, nickel-hydrogen batteries, nickel-zinc batteries, lithium secondary batteries and the like. Among them, the lithium secondary batteries have almost no memory effect compared to nickel-based secondary batteries and thus are in the limelight due to advantageous such as free charging and discharging, low self-discharge rate and high energy density.

Batteries are used in a wide variety of applications, and large capacities are often required for devices such as electric-driven vehicles or smart grid systems to which batteries are frequently utilized. In order to increase the capacity of the battery, the capacity of the secondary battery, namely the capacity of a battery cell itself, may be increased. However, in this case, the capacity increase effect is not large and there is a physical limitation on the size expansion of the secondary battery. Thus, generally, a battery pack in which a plurality of battery modules are connected in series and in parallel is widely used.

The plurality of battery modules included in the battery pack have different capacity performances from each other due to the difference in intrinsic characteristics or manufacturing environments and versatility of system applications as the use time elapses, which causes a difference in terminal voltage or state of charge (SOC) of the corresponding modules due to charging and discharging.

If a plurality of battery modules having different relative electrical characteristics are driven as one battery pack, a specific battery module having degraded performance may limit the charging or discharging capacity of the entire battery pack, age the battery pack and cause problems such as overvoltage.

Evenly controlling the terminal voltages between battery modules is known as module balancing or inter-module charge equalization. However, in the conventional inter-module charge equalization technology, it is difficult to individually perform balancing between specific battery modules that require module balancing, among a plurality of battery modules. In particular, in order to implement a charge equalization circuit that individually selects a specific battery module, a circuit structure becomes complicated, and the number and volume of wiring bundles increase. Thus, due to these problems, it is not easy to manufacture a module equalization device, and the manufacturing process may take long time and suffer from a high defective rate.

DISCLOSURE

Technical Problem

The present disclosure is designed to solve the problems of the related art, and therefore the present disclosure is directed to providing an apparatus and method for battery module balancing, which may effectively equalize charges between battery modules while balancing a plurality of battery modules included in a battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In order to accomplish the above object, an apparatus for balancing a plurality of battery modules electrically connected in series, each battery module having a cell assembly with a secondary battery, the apparatus comprises for each battery module a monitoring unit configured to monitor at least one of voltage, temperature and current of the cell assembly; a self-circulating path electrically connected to both ends of the cell assembly to form a closed circuit, the self-circulating path having an inductor configured to allow a charging current and a discharging current to flow on the self-circulating path and a first discharge MOSFET configured to open or close the self-circulating path, a connector having a plurality of connection terminals; a connection path electrically connecting the battery module to a neighboring battery module among the plurality of battery modules through the plurality of connection terminals, the connection path having a second discharge MOSFET to open or close the connection path; and a processor configured to receive a state of the cell assembly from the monitoring unit and control opening and closing operations of the first discharge MOSFET and the second discharge MOSFET on the basis of the received state of the cell assembly so that the plurality of battery modules are balanced.

In addition, each processor may be configured to repeatedly turn on and off the respective first discharge MOSFET or the respective second discharge MOSFET so that charges of neighboring cell assemblies are equalized through the respective self-circulating path and the respective connection path.

In addition, each processor may be configured to repeatedly turn on and off the respective first discharge MOSFET to generate an induced electromotive force with respect to the respective inductor by means of a discharging current of the cell assembly flowing through the respective self-circulating path and transmit the generated induced electromotive force to a neighboring battery module through the respective connection path.

In addition, each processor may be configured to repeatedly turn on and off the respective second discharge MOSFET to generate an induced electromotive force of the respective inductor by means of a discharging current of the respective cell assembly flowing through the respective connection path and transmit the generated induced electromotive force to a neighboring battery module through the respective self-circulating path.

In addition, each connection path may include a first internal connection path and a second internal connection path, the plurality of connection terminals may include a first connection terminal and a second connection terminal, each first internal connection path may be configured to electrically connect a node between a positive electrode terminal of the respective cell assembly and a first end of the respective inductor directly to the respective first connection terminal, and each second internal connection path may be configured to electrically connect a node between a second end of the inductor and the respective first discharge MOSFET directly to the respective second connection terminal.

In addition, each second discharge MOSFET is provided on the respective second internal connection path.

In addition, each connection path may further include an external connection path configured to electrically connect respective the first connection terminal and the respective second connection terminal of the respective battery module directly to the respective second connection terminal and the respective first connection terminal of the neighboring battery module.

In addition, in order to accomplish the above object, a battery management system (BMS) according to an embodiment of the present disclosure comprises the apparatus for balancing a plurality of battery modules according to the present disclosure.

In addition, in order to accomplish the above object, a battery pack according to an embodiment of the present disclosure comprises the apparatus for balancing a plurality of battery modules according to the present disclosure.

In addition, in order to accomplish the above object, a method for balancing a plurality of battery modules electrically connected in series, each battery module having a cell assembly with a secondary battery, the method comprising: monitoring at least one of voltage, temperature and current of each cell assembly; and receiving a state of each cell assembly, which is monitored in the monitoring step, and controlling, for each cell assembly, opening and closing operations of a respective first discharge MOSFET that opens and closes a respective self-circulating path, each first discharge MOSFET is electrically connected to both ends of the respective cell assembly to form a closed circuit and has an inductor that allows charging and discharging current to flow on the respective self-circulating path, and controlling, for each cell assembly, a respective second discharge MOSFET that opens and closes a connection path, each second discharge MOSFET electrically connects both ends of the respective inductor to a plurality of connection terminals and electrically connects neighboring battery modules to each other through the plurality of connection terminals, based on the received state of each cell assembly so that the plurality of battery modules are balanced.

Advantageous Effects

According to the present disclosure, it is possible to allow easy manufacture of the battery pack and easily reduction of its size since connectors may be simplified and the volume of wire harness may be reduced, when individually selecting battery modules to which charging and discharging are required for charge equalization of the battery modules.

In addition, in the configuration of individually selecting battery modules, there is an advantage that the structure of the wiring connected to the battery modules is simplified and the charge equalization speed between the battery modules is increased.

In addition, the battery module equalization device according to the present disclosure has an advantage of simplifying the charge equalization circuit by easily transferring energy between the battery modules without an external power connection.

In addition, according to an aspect of the present disclosure, it is possible to reduce the number of switches and resistors by using the induced electromotive force of the inductor and to reduce the power loss consumed by the resistors, thereby effectively balancing the battery modules.

The present disclosure may have various effects other than the above, and other effects of the present disclosure may be understood from the following description and more clearly figured out by the embodiments of the present disclosure.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the present disclosure, if it is determined that a detailed description of a related known structure or function may obscure the subject matter of the present disclosure, the detailed description will be omitted.

Throughout the specification, when a portion is referred to as "comprising" or "including" any element, it means that the portion may include other elements further, without excluding other elements, unless specifically stated otherwise. Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

In this specification, the secondary battery refers to a one independent cell that includes a negative electrode terminal and a positive electrode terminal and is physically separable. For example, one pouch-type lithium polymer cell may be regarded as the secondary battery.

An apparatus for battery module balancing according to an embodiment of the present disclosure may be an apparatus for balancing a plurality of battery modules 100, 200 included in a battery pack. More specifically, the apparatus for battery module balancing according to an embodiment of the present disclosure may be an apparatus for equalizing charges between a plurality of battery modules 100, 200, which respectively include cell assemblies 10, 20 having at least one secondary battery and electrically connected with each other in series.

Figure 1:
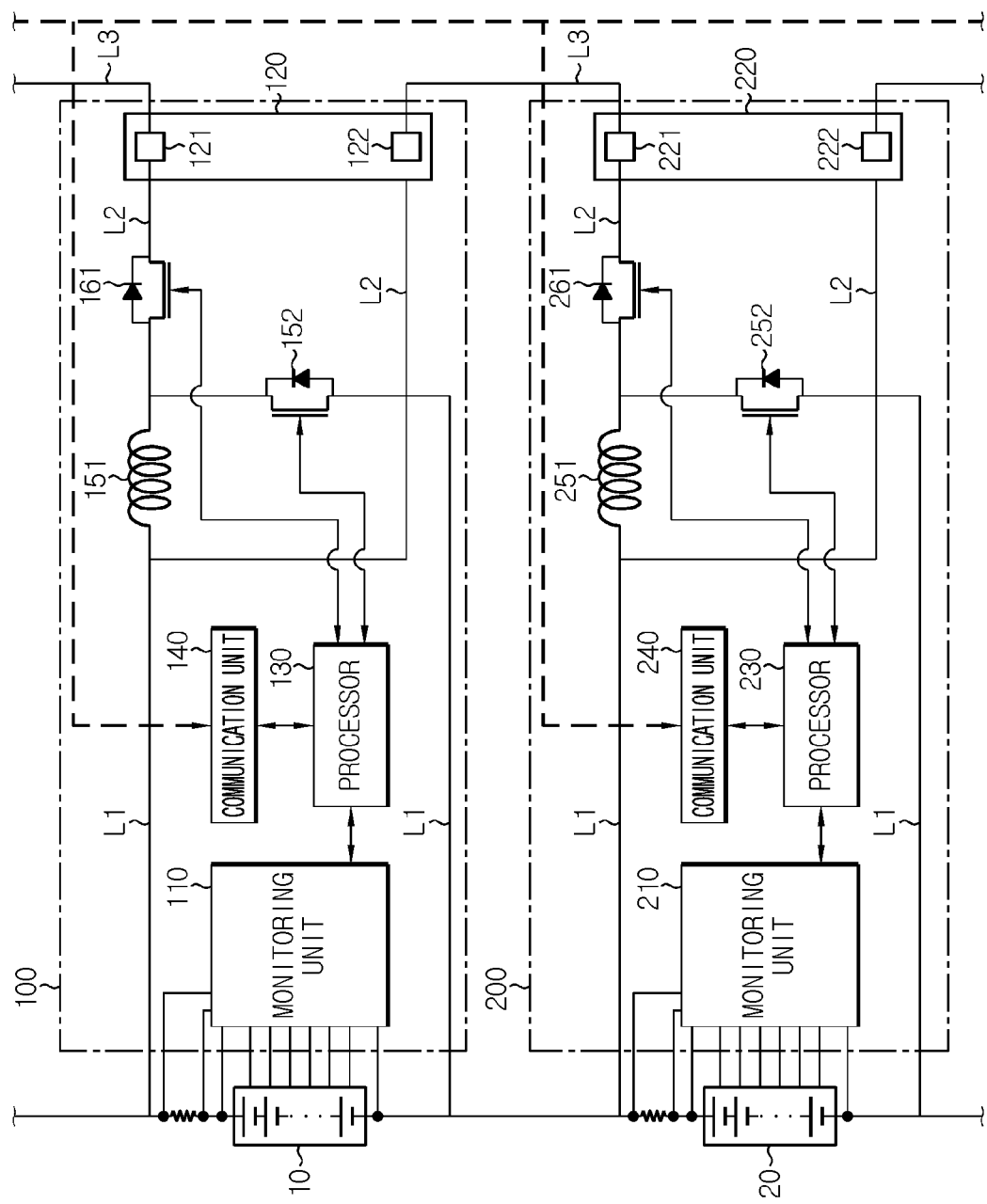
FIG. 1 is a diagram schematically showing some components of an apparatus for battery module balancing according to an embodiment of the present disclosure.

FIG. 1 is a diagram schematically showing some components of an apparatus for battery module balancing according to an embodiment of the present disclosure.

Referring to FIG. 1, the apparatus for battery module balancing according to an embodiment of the present disclosure includes monitoring units 110, 210, a self-circulating path L1, connectors 120, 220, connection paths L2, L3 and processors 130, 230.

The monitoring units 110, 210 may be provided to the battery modules 100, 200, respectively. For example, as shown in FIG. 1, the monitoring units 110, 210 may be electrically connected to the cell assemblies 10, 20 provided in the battery modules 100, 200, respectively. In addition, the monitoring units 110, 210 may be electrically connected to both ends of the cell assemblies 10, 20, respectively. Also, the monitoring units 110, 210 may be electrically connected to both ends of a current sensor provided on a charging and discharging path, respectively.

In addition, the monitoring units 110, 210 may be configured to monitor at least one of voltage, temperature and current of each cell assembly 10, 20. For example, the monitoring units 110, 210 may be configured to measure at least one of voltage, temperature and current of the secondary battery included in each cell assembly 10, 20. For example, the monitoring units 110, 210 may be configured to measure the voltage of the secondary battery. For example, as shown in FIG. 1, the monitoring units 110, 210 may be electrically connected to both ends of the cell assemblies 10, 20. In addition, the monitoring units 110, 210 may be electrically connected to the processors 130, 230 to transmit and receive electric signals. In addition, the monitoring units 110, 210 may be electrically connected to the processors 130, 230 to transmit and receive electric signals. In addition, under the control of the processors 130, 230, the monitoring units 110, 210 may measure the voltage at both ends of the cell assemblies 10, 20 at time intervals and output a signal indicating the magnitude of the measured voltage to the processors 130, 230. In this case, the processors 130, 230 may determine the voltage of the cell assemblies 10, 20 from the signal output from the monitoring units 110, 210. For example, the monitoring units 110, 210 may be implemented using a voltage measurement circuit commonly used in the art.

In addition, the monitoring units 110, 210 may be configured to measure the current flowing through the cell assemblies 10, 20. For example, as shown in FIG. 1, the monitoring units 110, 210 may be electrically connected to both ends of a current sensor provided on the charging and discharging path of the cell assemblies 10, 20. In addition, the monitoring units 110, 210 may be electrically coupled to the processors 130, 230 to transmit and receive electric signals. In addition, under the control of the processors 130, 230, the monitoring units 110, 210 may repeatedly measure the magnitude of the charging current or the discharging current of the cell assemblies 10, 20 at time intervals and output a signal indicating the magnitude of the measured current to the processors 130, 230. In this case, the processors 130, 230 may determine the magnitude of the current from the signal output from the monitoring units 110, 210. For example, the current sensor may be implemented using a hall sensor or a sense resistor generally used in the art.

In addition, the monitoring units 110, 210 may be configured to measure the temperature of the cell assemblies 10, 20. For example, as shown in FIG. 1, the monitoring units 110, 210 may be connected to the cell assemblies 10, 20 to measure the temperature of the secondary battery included in the cell assemblies 10, 20. In addition, the monitoring units 110, 210 may be electrically coupled to the processors 130, 230 to transmit and receive electric signals. In addition, the monitoring units 110, 210 may repeatedly measure the temperatures of the cell assemblies 10, 20 at time intervals and output a signal indicating the magnitude of the measured temperature to the processors 130, 230. In this case, the processors 130, 230 may determine the temperature of the secondary battery from the signal output from the monitoring units 110, 210. For example, monitoring units 110, 210 may be implemented using a thermocouple commonly used in the art.

The self-circulating path L1 may be provided to each battery module 100, 200. In addition, the self-circulating path L1 may be electrically connected to both ends of each cell assembly 10, 20 to form a closed circuit. For example, as shown in FIG. 1, the self-circulating path L1 may be provided to each battery module 100, 200 and electrically connected to both ends of the cell assemblies 10, 20, respectively. In addition, the self-circulating path L1 may form an electrically closed circuit extending from the positive electrode terminals of the cell assemblies 10, 20 to the negative electrode terminals of the cell assemblies 10, 20.

In addition, the self-circulating path L1 may include inductors 151, 251 and first discharge MOSFETs 152, 252 on the self-circulating path L1.

The inductors 151, 251 may be configured to allow a charging and discharging current to flow on the path. For example, as shown in FIG. 1, the inductors 151, 251 may be provided on the self-circulating path L1. For example, the inductors 151, 251 may be provided on the self-circulating path L1 that is directly connected to the positive electrode terminals of the cell assemblies 10, 20. In addition, the inductors 151, 251 may be configured to allow a charging and discharging current flowing on the self-circulating path L1 to flow therethrough. For example, the inductors 151, 251 may be implemented using a coil having an inductance L[H] component according to Faraday's law.

The first discharge MOSFETs 152, 252 may be configured to open and close the path. For example, as shown in FIG. 1, the first discharge MOSFETs 152, 252 may be provided on the self-circulating path L1 to open and close the self-circulating path L1. For example, the first discharge MOSFETs 152, 252 may be directly provided between the inductors 151, 251 and the negative electrode terminals of the cell assemblies 10, 20. In addition, the first discharge MOSFETs 152, 252 may be electrically connected to the processors 130, 230 to transmit and receive electric signals so as to be turned off or on under the control of the processors 130, 230.

The connectors 120, 220 may be provided to the battery modules 100, 200, respectively. For example, as shown in FIG. 1, the connectors 120, 220 may be provided at one side of the battery modules 100, 200, respectively. In addition, the connectors 120, 220 may include a plurality of connection terminals. For example, as shown in FIG. 1, the connectors 120, 220 may include two connection terminals. In addition, the connectors 120, 220 may electrically connect the battery modules 100, 200 to each other directly through the connection terminals.

The connection paths L2, L3 may be provided to the battery modules 100, 200, respectively. In addition, the connection paths L2, L3 may electrically connect both ends of the inductors 151, 251 to the plurality of connection terminals 121, 122, 221, 222, respectively. In addition, the connection paths L2, L3 may electrically connect neighboring battery modules 100, 200 to each other through the plurality of connection terminals 121, 122, 221, 222. For example, as shown in FIG. 1, the connection paths L2, L3 may be provided to the battery modules 100, 200, respectively, to electrically connect both ends of the inductors 151, 251 directly to the connection terminals 121, 122, 221, 222. In addition, the connection paths L2, L3 may electrically connect the connection terminals 121, 122, 221, 222 respectively provided to the battery modules 100, 200 to each other such that neighboring battery modules 100, 200 are electrically connected.

In addition, the connection paths L2, L3 may include second discharge MOSFETs 161, 261, respectively. In addition, the second discharge MOSFETs 161, 261 may be provided on the path to open and close the path. For example, as shown in FIG. 1, the second discharge MOSFETs 161, 261 may be provided on the connection paths L2, L3 to open and close the connection paths L2, L3. For example, the second discharge MOSFETs 161, 261 may be provided between the inductors 151, 251 and the connection terminals 121, 122, 221, 222. In addition, the second discharge MOSFETs 161, 261 may be electrically connected to the processors 130, 230 to transmit and receive electric signals so as to be turned off or on under the control of the processors 130, 230.

Preferably, the first discharge MOSFETs 152, 252 and the second discharge MOSFETs 161, 261 according to an embodiment of the present disclosure are a field effect transistor (FET) element having a gate terminal, a drain terminal and a source terminal and may be turned on or off depending on whether a channel is formed according to a voltage applied between the gate terminal and the source terminal. For example, the FET element may be a metal oxide semiconductor field effect transistor (MOSFET).

In addition, the first discharge MOSFETs 152, 252 and the second discharge MOSFETs 161, 261 may include a FET body and a parasitic diode, respectively. Here, the parasitic diode is a diode connected in parallel with the FET body and acts as a rectifier for conducting a current in one direction.

For example, as shown in FIG. 1, in the first discharge MOSFETs 152, 252 according to an embodiment of the present disclosure, the drain terminal may be directly connected to one end of the inductors 151, 251, and the source terminal may be directly connected to the negative electrode terminal of the cell assemblies 10, 20. In addition, in the first discharge MOSFETs 152, 252, the parasitic diodes may allow a current to be conducted from the source terminal to the drain terminal. That is, the parasitic diodes of the first discharge MOSFETs 152, 252 may set the direction from the negative electrode terminals of the cell assemblies 10, 20 to the inductors 151, 251 as a forward direction.

For example, as shown in FIG. 1, in the second discharge MOSFETs 161, 261 according to an embodiment of the present disclosure, the drain terminal may be directly connected to the connection terminals 121, 221, and the source terminal may be directly connected to one end of the inductors 151, 251. In addition, in the second discharge MOSFETs 161, 261, the parasitic diodes may allow a current to be conducted from the source terminal to the drain terminal. That is, the parasitic diodes of the second discharge MOSFETs 161, 261 may set the direction from the inductors 151, 251 to the connection terminals 121, 221 as a forward direction.

In addition, the processors 130, 230 may control the turn-on and turn-off operations of the first discharge MOSFETs 152, 252 and the second discharge MOSFETs 161, 261. For example, as shown in FIG. 1, the processors 130, 230 may be electrically connected to the gate terminals of the first discharge MOSFETs 152, 252 and the second discharge MOSFETs 161, 261 to transmit and receive electric signals. In addition, the processors 130, 230 may control the turn-on and turn-off operations of the first discharge MOSFETs 152, 252 and the second discharge MOSFETs 161, 261 by controlling the voltages applied to the gate terminals of the first discharge MOSFETs 152, 252 and the second discharge MOSFETs 161, 261.

Preferably, the connection paths L2, L3 according to an embodiment of the present disclosure may include a first internal connection path L2 and a second internal connection path L2. In addition, the plurality of connection terminals 121, 122, 221, 222 may include first connection terminals 122, 222 and second connection terminals 121, 221.

As shown in FIG. 1, the first internal connection path L2 may be configured to electrically connect a node between the positive electrode terminal of each cell assembly 10, 20 and one end of the inductors 151, 251 directly to the first connection terminals 122, 222.

As shown in FIG. 1, the second internal connection path L2 may be configured to electrically connect a node between the other end of the inductors 151, 251 and the first discharge MOSFETs 152, 252 directly to the second connection terminals 121, 221.

Preferably, the second discharge MOSFETs 161, 261 according to an embodiment of the present disclosure may be provided on the second internal connection path L2. For example, as shown in FIG. 1, the second discharge MOSFETs 161, 261 may be provided on the second internal connection path L2 that directly connects the node between the other end of the inductors 151, 251 and the first discharge MOSFETs 152, 252 directly to the second connection terminal 121, 221.

Preferably, the connection paths L2, L3 according to an embodiment of the present disclosure may further include an external connection path L3.

The external connection path L3 may be configured to be electrically connect the first connection terminals 122, 222 and the second connection terminal 121, 221 of each battery module 100, 200 directly to the second connection terminal 121, 221 and the first connection terminals 122, 222 of a neighboring battery module 100, 200. For example, as shown in FIG. 1, the external connection path L3 may electrically connect the second connection terminal 221 of the second battery module 200 directly to the first connection terminal 122 of the first battery module 100. In addition, preferably, the external connection path L3 according to an embodiment of the present disclosure may connect the battery modules 100, 200 to each other in a daisy chain manner.

The processors 130, 230 may be electrically connected to the monitoring units 110, 210 to transmit and receive electric signals so as to receive the states of the cell assemblies 10, 20 from the monitoring units 110, 210. For example, the states of the cell assemblies 10, 20 may include SOC or SOH of the secondary battery. For example, the processors 130, 230 may receive at least one of voltage, temperature and current of the secondary battery from the monitoring units 110, 210. In addition, the processors 130, 230 may estimate the SOC of the secondary battery on the basis of at least one of voltage, current and temperature of the secondary battery.

In addition, the processors 130, 230 may receive state information of the cell assemblies 10, 20 from the monitoring units 110, 210. Here, the state information of the cell assemblies 10, 20 may include a voltage value of the secondary battery, a current value of the secondary battery, and a temperature value of the secondary battery. More specifically, the state information of the cell assemblies 10, 20 may include voltage values at both ends of the cell assemblies 10, 20, current values flowing through the cell assemblies 10, 20, and temperature values of the cell assemblies 10, 20.

In addition, the processors 130, 230 may calculate a remaining capacity of the secondary battery by calculating a state of charge (SOC) of the secondary battery using at least one of the measured voltage value, the measured current value and the measured temperature value for the cell assemblies 10, 20 received from the monitoring units 110, 210. In addition, the processors 130, 230 may calculate an estimated SOC by using the estimated remaining capacity of the secondary battery. Here, the estimated SOC may be calculated as a value corresponding to the remaining capacity of the secondary battery in the range of 0% to 100%.

In an embodiment of the present disclosure, the processors 130, 230 may estimate the SOC of the secondary battery by integrating a charging current and a discharging current of the secondary battery. Here, an initial SOC value when the secondary battery starts charging or discharging may be determined using an open circuit voltage (OCV) of the secondary battery measured before the secondary battery starts charging or discharging. To this end, the processors 130, 230 include an OCV-SOC look-up table that defines the SOC for each OCV, and may map the SOC corresponding to the OCV of the secondary battery from the look-up table.

In another embodiment of the present disclosure, the processors 130, 230 may calculate the SOC of the secondary battery by using an extended Kalman filter. The extended Kalman filter is a mathematical algorithm that adaptively estimates a SOC of a secondary battery by using voltage, current and temperature of the secondary battery.

Here, the estimation of the SOC using the extended Kalman filter may be understood with reference to, for example, the article of Gregory L. Plett "Extended Kalman filtering for battery management systems of LiPB-based HEV battery packs Parts 1, 2 and 3" (Journal of Power Source 134, 2004, p. 252-261). In addition to the current integration method or the extended Kalman filter as above, the SOC of the secondary battery may also be determined by other known methods for estimating a SOC by selectively utilizing voltage, current and temperature of the secondary battery.

More preferably, the processors 130, 230 according to an embodiment of the present disclosure may receive at least one of voltage, current and temperature of the secondary battery from the monitoring units 110, 210 and estimate a state of health (SOH) of the secondary battery on the basis of at least one of the voltage, current and temperature of the secondary battery. Here, the SOH of the secondary battery refers to a degradation rate. The degradation rate of a secondary battery may also be determined by other known methods for estimating a degradation rate by selectively utilizing a SOC of the secondary battery and an internal resistance of the secondary battery, in addition to the above method using voltage, current and temperature of the secondary battery.

In addition, the processors 130, 230 may balance the plurality of battery modules 100, 200 by controlling the opening and closing operations of the first discharge MOSFETs 152, 252 and the second discharge MOSFETs 161, 261 on the basis of the state of the received cell assemblies 10, 20, respectively.

Preferably, the processors 130, 230 according to an embodiment of the present disclosure may equalize charges between neighboring cell assemblies 10, 20 through the self-circulating path L1 and the connection paths L2, L3 by repeatedly turning on and off the first discharge MOSFETs 152, 252 or the second discharge MOSFETs 161, 261.

Preferably, as shown in FIG. 1, the apparatus for battery module balancing according to an embodiment of the present disclosure may further include communication units 140, 240, respectively.

The communication units 140, 240 may be electrically connected to the processors 130, 230 to transmit and receive electric signals. In addition, the processors 130, 230 may receive the SOCs of neighboring battery modules 100, 200 through communication units 140, 240. In addition, the processors 130, 230 may balance the plurality of battery modules 100, 200 on the basis of the received SOCs of the battery modules 100, 200.

Preferably, the apparatus for battery module balancing according to an embodiment of the present disclosure may further include a memory device.

The memory device may be electrically connected to the processors 130, 230 to transmit and receive electric signals. In addition, the memory device may store information necessary for controlling the first discharge MOSFETs 152, 252 and the second discharge MOSFETs 161, 261 in advance.

Meanwhile, the processors 130, 230 may be implemented to optionally include processors 130, 230, an application-specific integrated circuit (ASIC), other chipsets, a logic circuit, a register, and a communication modem and/or a data processing device, known in the art, to perform the above operation.

Meanwhile, the memory device is not particularly limited as long as it is a storage medium capable of recording and erasing information. For example, the memory device may be a RAM, a ROM, a register, a hard disk, an optical recording medium, or a magnetic recording medium. The memory device may also be electrically connected to the processors 130, 230, for example, via a data bus or the like so as to be accessible by the processors 130, 230, respectively. The memory device may also store and/or update and/or erase and/or transmit a program including various control logics performed by the processors 130, 230 and/or data generated when the control logics are executed.

Figure 2:
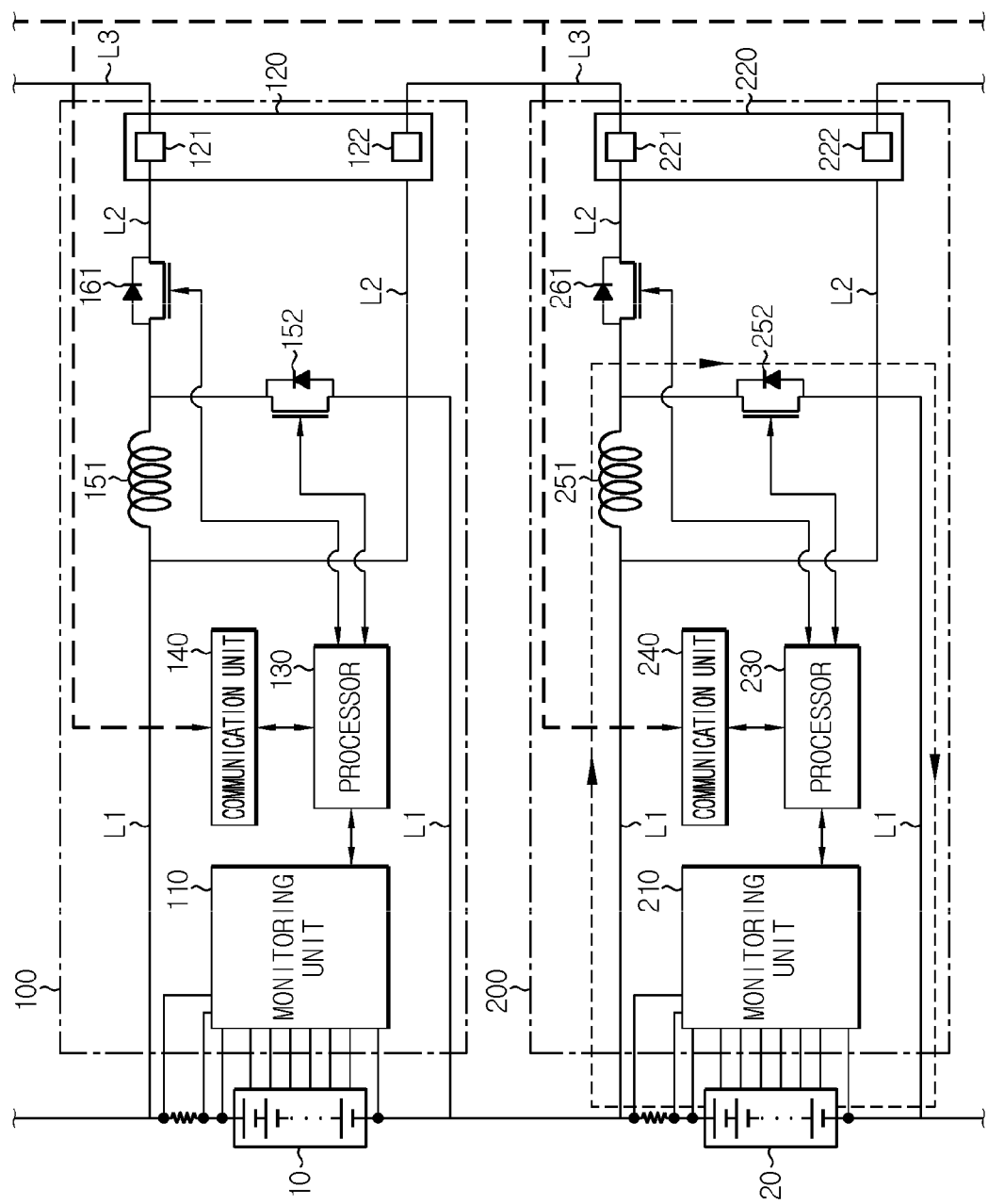
FIGS. 2 and 3 are diagrams showing a path for the apparatus for battery module balancing according to an embodiment of the present disclosure to balance battery modules.
Figure 3:
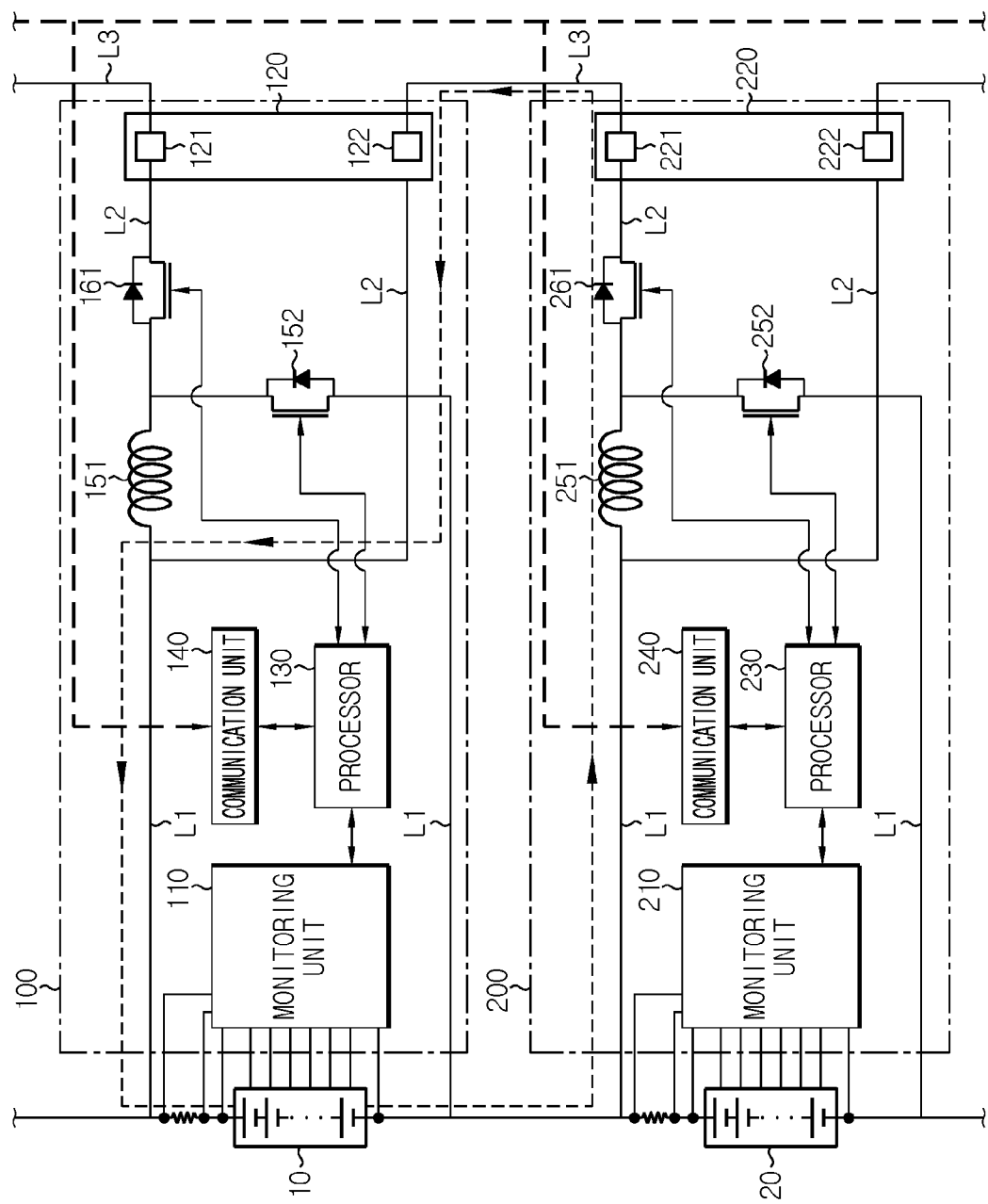

FIGS. 2 and 3 are diagrams showing a path for the apparatus for battery module balancing according to an embodiment of the present disclosure to balance battery modules.

Referring to FIGS. 2 and 3, the processor 230 according to an embodiment of the present disclosure may be configured to generate an induced electromotive force for the inductor 251 by means of the discharging current of the cell assembly flowing through the self-circulating path L1 by repeatedly turning on and off the first discharge MOSFET 252 and transfer the generated induced electromotive force to a neighboring battery module through the connection paths L2, L3.

For example, as shown in FIG. 2, the processor 230 may allow a discharging current to flow on the self-circulating path L1 included in the second battery module 200. More specifically, when it is intended to discharge the second cell assembly 20 included in the second battery module 200 and charge the first cell assembly 10 included in the first battery module 100, the processor 230 may allow a discharging current to flow on the self-circulating path L1 included in the second battery module 200. For example, the processor 230 may turn on the first discharge MOSFET 252 included in the second battery module 200 so that the discharging current flows sequentially through the second cell assembly 20, the inductor 251 and the first discharge MOSFET 252.

In addition, as shown in FIG. 3, the processor 230 may turn off the first discharge MOSFET 252 included in the second battery module 200 to generate an induced electromotive force for the inductor 251. For example, if the first discharge MOSFET 252 is changed from a turn-on state to a turn-off state, the inductor 251 may generate an induced electromotive force according to Faraday's law of Equation 1 below. That is, the inductor 251 may generate an induced electromotive force for maintaining the direction of the current of FIG. 2.

$$v(t) = L\frac{di(t)}{dt} \quad \langle \text{Equation 1} \rangle$$

Here, v(t) is an induced electromotive force, L is inductance, t is time, and i(t) is a current flowing through the inductor.

In addition, as shown in FIG. 3, when an induced electromotive force is generated at the inductor 251, the processor 230 may charge the first cell assembly 10 through the connection paths L2, L3 and the self-circulating path L1, which sequentially connect the inductor 251, the second discharge MOSFET 261, the connector 220 of the second battery module 200, the connector 120 of the first battery module 100 and the first cell assembly 10.

Through this configuration, the processor 230 may discharge the second cell assembly 20 and charge the first cell assembly 10 by repeatedly turning on and off the first discharge MOSFET 252.

Through this configuration, the apparatus for battery module balancing according to an embodiment of the present disclosure may effectively reduce the number of switches and resistors by using the induced electromotive force of the inductor and reduce the power loss consumed by the resistors, thereby effectively balancing the battery modules.

Figure 4:
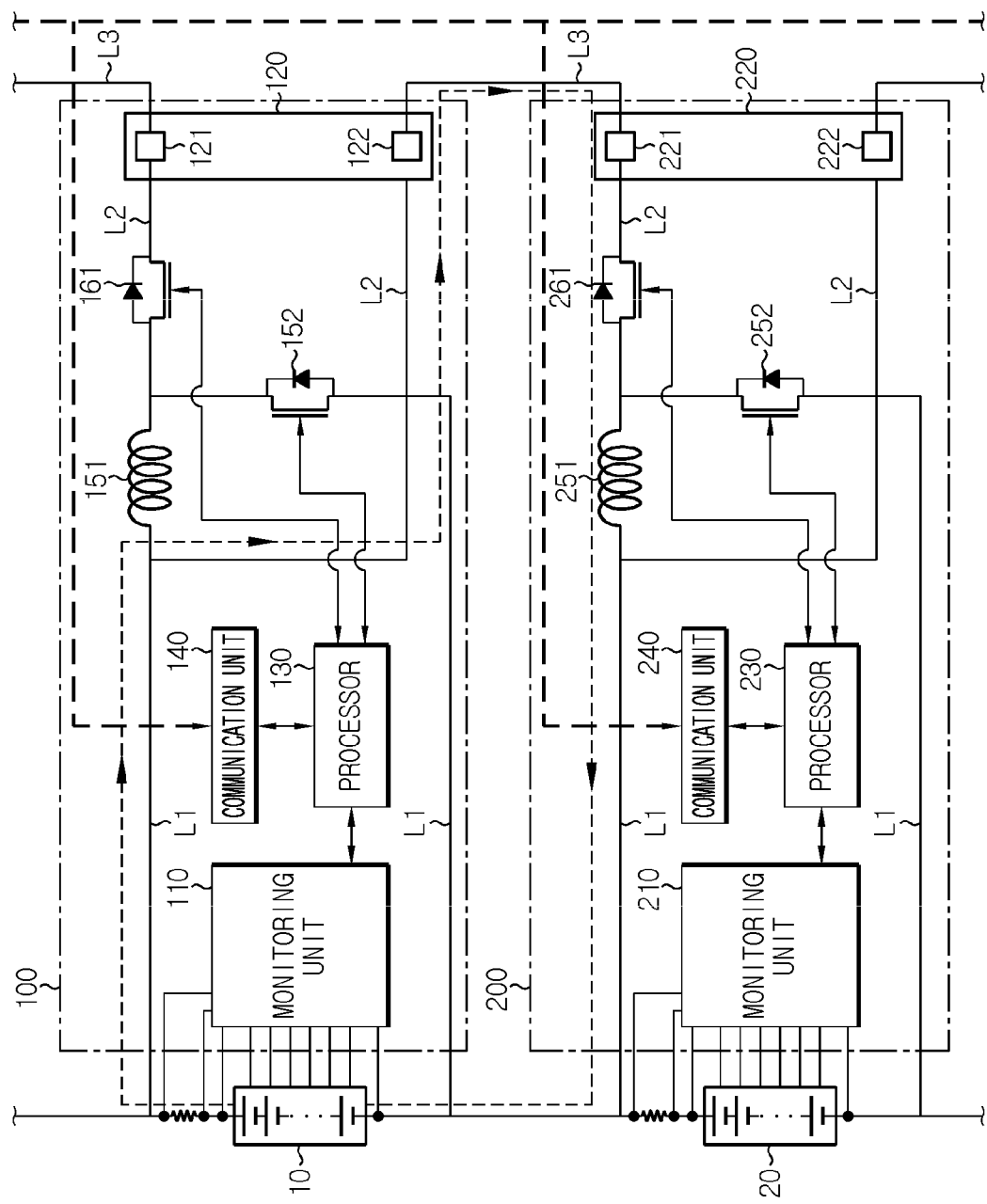
FIGS. 4 and 5 are diagrams showing a path for the apparatus for battery module balancing according to another embodiment of the present disclosure to balance battery modules.
Figure 5:
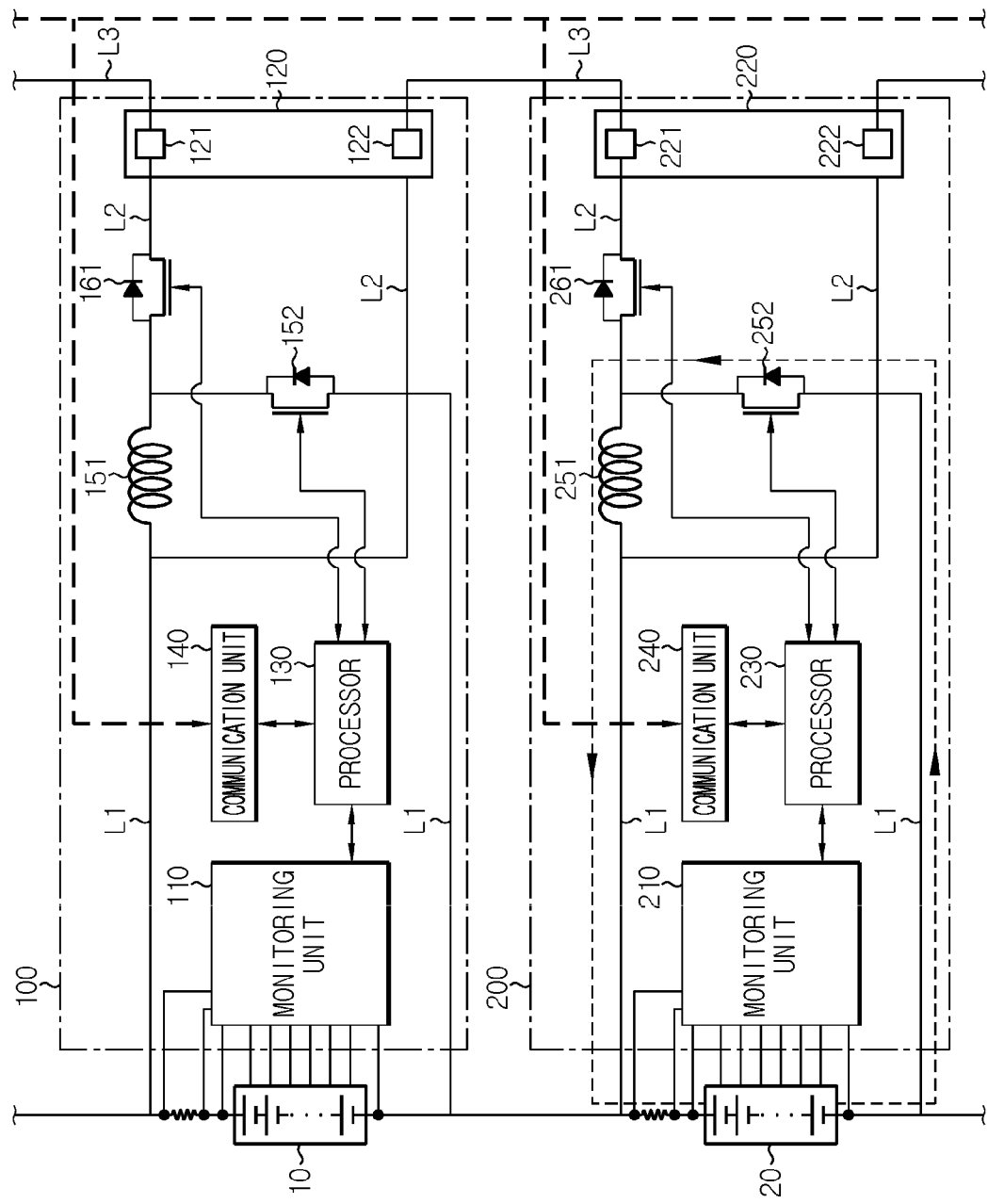

FIGS. 4 and 5 are diagrams showing a path for the apparatus for battery module balancing according to another embodiment of the present disclosure to balance battery modules.

Referring to FIGS. 4 and 5, the processor 230 according to an embodiment of the present disclosure may be configured to generate an induced electromotive force of the inductor 251 by means of the discharging current of the cell assembly flowing through the connection paths L2, L3 by repeatedly turning on and off the second discharge MOSFET 261 and transfer the generated induced electromotive force to a neighboring battery module through the self-circulating path L1.

For example, as shown in FIG. 4, the processor 230 may allow a discharging current to flow through the self-circulating path L1 and the connection paths L2, L3 included in the first battery module 100 and the second battery module 200. More specifically, when it is intended to discharge the first cell assembly 10 included in the first battery module 100 and charge the second cell assembly 20 included in the second battery module 200, the processor 230 may allow a discharging current to flow through the self-circulating path L1 and the connection paths L2, L3 included in the first battery module 100. For example, the processors 130, 230 allow a discharging current to sequentially flow through the first cell assembly 10, the connector 120 of the first battery module 100, the connector 220 of the second battery module 200, the second discharge MOSFET 261 and the inductor 251 by turning off the first discharge MOSFET 152 included in the first battery module 100 and turning on the second discharge MOSFET 261 included in the second battery module 200.

In addition, as shown in FIG. 5, the processor 230 may generate an induced electromotive force for the inductor 251 by turning off the second discharge MOSFET 261 included in the second battery module 200. For example, if the second discharge MOSFET 261 is changed from a turn-on state to a turn-off state, an induced electromotive force may be generated at the inductor 251 according to Faraday's law of Equation 1. That is, the inductor 251 may generate an induced electromotive force to maintain the direction of the current of FIG. 4.

In addition, as shown in FIG. 5, if the induced electromotive force is generated at the inductor 251, the processor 230 may charge the second cell assembly 20 through the self-circulating path L1 that sequentially connects the inductor 251, the second cell assembly 20 and the first discharge MOSFET 252.

Through this configuration, the processor 230 may discharge the first cell assembly 10 and charge the second cell assembly 20 by repeatedly turning on and off the second discharge MOSFET 261.

Through this configuration, the apparatus for battery module balancing according to an embodiment of the present disclosure may easily configure lines of a balancing circuit and efficiently balance the plurality of battery modules through simple switch operations.

The apparatus for battery module balancing according to the present disclosure may include a battery management system (BMS). That is, the BMS according to the present disclosure may be included in the apparatus for battery module balancing of the present disclosure as described above. In this configuration, at least a part of the components of the apparatus for battery module balancing according to the present disclosure may be implemented by supplementing or adding functionality of components included in the conventional BMS. For example, the processor and the memory device of the apparatus for battery module balancing according to the present disclosure may be implemented as components of the BMS.

In addition, the apparatus for battery module balancing according to the present disclosure may be provided to a battery pack. That is, the battery pack according to the present disclosure may include the apparatus for battery module balancing according to the present disclosure. Here, the battery pack may include at least one secondary battery, the apparatus for battery module balancing, electrical components (such as a BMS, a relay and a fuse), a case, and so on.

Figure 6:
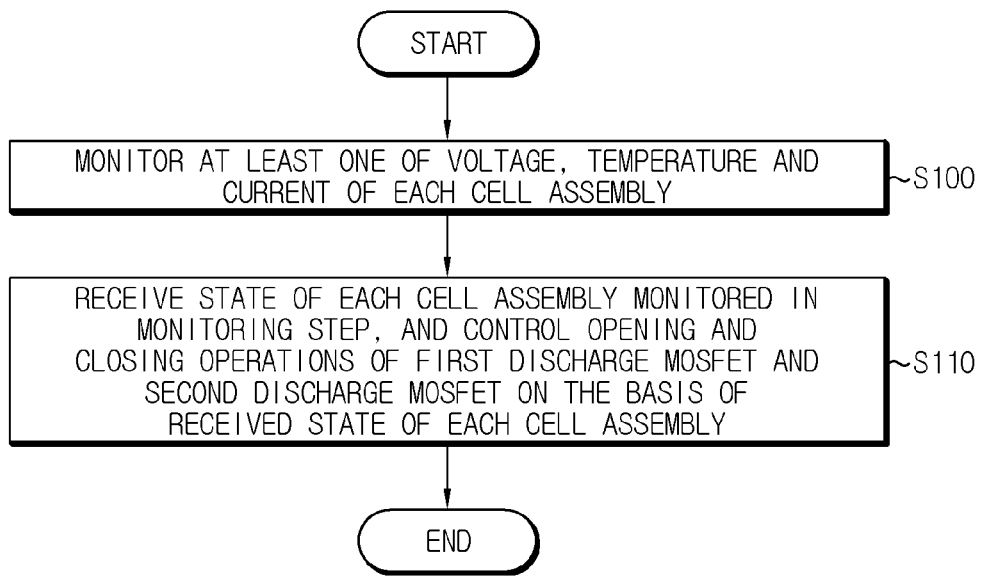
FIG. 6 is a flowchart schematically showing a method for battery module balancing according to an embodiment of the present disclosure.

FIG. 6 is a schematic flowchart for illustrating a method for battery module balancing according to an embodiment of the present disclosure. In FIG. 6, each step may be performed by any component of the apparatus for battery module balancing according to the present disclosure as described above.

As shown in FIG. 6, the method for battery module balancing according to the present disclosure includes a monitoring step S100 and a balancing step S110.

First, in the monitoring step S100, at least one of voltage, temperature and current of each cell assembly may be monitored. Subsequently, in the balancing step S110, the state of each cell assembly monitored in the monitoring step may be received, and opening and closing operations of a first discharge MOSFET configured to open or close a self-circulating path, which is electrically connected to both ends of each cell assembly to form a closed circuit and has an inductor configured to allow a charging and discharging current to flow on the self-circulating path, and a second discharge MOSFET configured to open or close a connection path, which electrically connects both ends of the inductor to a plurality of connection terminals and electrically connects neighboring battery modules to each other through the plurality of connection terminals, may be controlled on the basis of the received state of each cell assembly so that the plurality of battery modules are balanced Preferably, in the balancing step S110 according to an embodiment of the present disclosure, the charges of neighboring cell assemblies may be equalized through the self-circulating path and the connection path by repeatedly turning on and off the first discharge MOSFET or the second discharge MOSFET.

Preferably, in the balancing step S110 according to an embodiment of the present disclosure, an induced electromotive force may be generated at the inductor by means of the discharging current of the cell assembly flowing through the self-circulating path by repeatedly turning on and off the first discharge MOSFET, and the generated induced electromotive force may be transferred to a neighboring battery module through the connection path.

Preferably, in the balancing step S110 according to an embodiment of the present disclosure, an induced electromotive force may be generated at the inductor by means of the discharging current of the cell assembly flowing on the connection path by repeatedly turning on and off the second discharge MOSFET, and the induced electromotive force may be transferred to a neighboring battery module through the self-circulating path.

Also, when the control logic is implemented in software, the processor may be implemented as a set of program modules. At this time, the program modules may be stored in a memory device and executed by the processor.

In addition, there is no particular limitation on the types of various control logics of the processor, as long as one or more control logics are combined and the combined control logic is written in a computer-readable code system so that the computer-readable access is possible. As one example, the recording medium includes at least one selected from the group consisting of a ROM, a RAM, a register, a CD-ROM, a magnetic tape, a hard disk, a floppy disk and an optical data recording device. In addition, the code system may be stored and executed in a distributed manner on computers connected through a network. Moreover, functional programs, code and segments for implementing the combined control logics may be easily inferred by programmers in the technical field to which the present disclosure belongs.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

10: first cell assembly
20: second cell assembly
100: first battery module
110: monitoring unit
120: connector
121: second connection terminal
122: first connection terminal
130: processor
140: communication unit
151: inductor
152: first discharge MOSFET
161: second discharge MOSFET
200: second battery module
210: monitoring unit
220: connector
221: second connection terminal
222: first connection terminal
230: processor
240: communication unit
251: inductor
252: first discharge MOSFET
261: second discharge MOSFET
L1: self-circulating path
L2: internal connection path
L3: external connection path

What is claimed is:

1. An apparatus for balancing of a plurality of battery modules electrically connected in series, each battery module having a cell assembly with a secondary battery, the apparatus comprises for each battery module:
a monitoring unit configured to monitor at least one of voltage, temperature and current of the cell assembly;
a self-circulating path electrically connected to both ends of the cell assembly to form a closed circuit, the self-circulating path including:
an inductor configured to allow a charging current and a discharging current to flow on the self-circulating path; and
a first discharge MOSFET configured to open or close the self-circulating path;
a connector having a plurality of connection terminals;
a connection path electrically connecting both ends of the inductor to the plurality of connection terminals and electrically connecting the battery module to a neighboring battery module among the plurality of battery modules through the plurality of connection terminals, the connection path having a second discharge MOSFET to open or close the connection path; and a processor configured to receive a state of the cell assembly from the monitoring unit and control opening and closing operations of the first discharge MOSFET and the second discharge MOSFET on the basis of the received state of the cell assembly so that the plurality of battery modules are balanced.

2. The apparatus according to claim 1,
wherein each processor is configured to repeatedly turn on and off the respective first discharge MOSFET or the respective second discharge MOSFET so that charges of neighboring cell assemblies are equalized through the respective self-circulating path and the respective connection path.

3. The apparatus according to claim 1,
wherein each processor is configured to repeatedly turn on and off the respective first discharge MOSFET to generate an induced electromotive force with respect to the respective inductor by means of a discharging current of the respective cell assembly flowing through the respective self-circulating path and transmit the generated induced electromotive force to the neighboring battery module through the respective connection path.

4. The apparatus according to claim 1,
wherein each processor is configured to repeatedly turn on and off the respective second discharge MOSFET to generate an induced electromotive force of the respective inductor by means of a discharging current of the respective cell assembly flowing through the respective connection path and transmit the generated induced electromotive force to the neighboring battery module through the respective self-circulating path.

5. The apparatus according to claim 1,
wherein each connection path includes a first internal connection path and a second internal connection path, and the respective plurality of connection terminals include a first connection terminal and a second connection terminal,
wherein each first internal connection path is configured to electrically connect a node between a positive electrode terminal of the respective cell assembly and a first end of the respective inductor directly to the respective first connection terminal, and wherein each second internal connection path is configured to electrically connect a node between a second end of the respective inductor and the respective first discharge MOSFET directly to the respective second connection terminal.

6. The apparatus according to claim 5,
wherein each second discharge MOSFET is provided on the respective second internal connection path.

7. The apparatus according to claim 5,
wherein each connection path further includes an external connection path configured to electrically connect the respective first connection terminal and the respective second connection terminal of the respective battery module directly to the second connection terminal and the first connection terminal of the neighboring battery module among the plurality of battery modules.

8. A battery management system (BMS), comprising the apparatus for balancing a plurality of battery modules according to claim 1.

9. A battery pack, comprising the apparatus for balancing a plurality of battery modules according to claim 1.

10. A method for balancing a plurality of battery modules electrically connected in series, each battery module having a cell assembly with a secondary battery, the method comprising:

monitoring at least one of voltage, temperature and current of each cell assembly; and receiving a state of each cell assembly, which is monitored in the monitoring step; and controlling, for each cell assembly, opening and closing operations of a respective first discharge MOSFET that opens and closes a self-circulating path, each first discharge MOSFET being electrically connected to both ends of the respective cell assembly to form a closed circuit and having an inductor that allows a charging and discharging current to flow on the respective self-circulating path, and controlling, for each cell assembly, a respective second discharge MOSFET that opens and closes a connection path, each second discharge MOSFET being electrically connects both ends of the respective inductor to a plurality of connection terminals and electrically connects neighboring battery modules to each other through the plurality of connection terminals, based on the received state of each cell assembly so that the plurality of battery modules are balanced.

* * * * *